C. C. CHANDLER.
SECTIONAL PNEUMATIC TIRE.
APPLICATION FILED MAY 8, 1918.
1,297,097.
Patented Mar. 11, 1919.
2 SHEETS—SHEET 2.
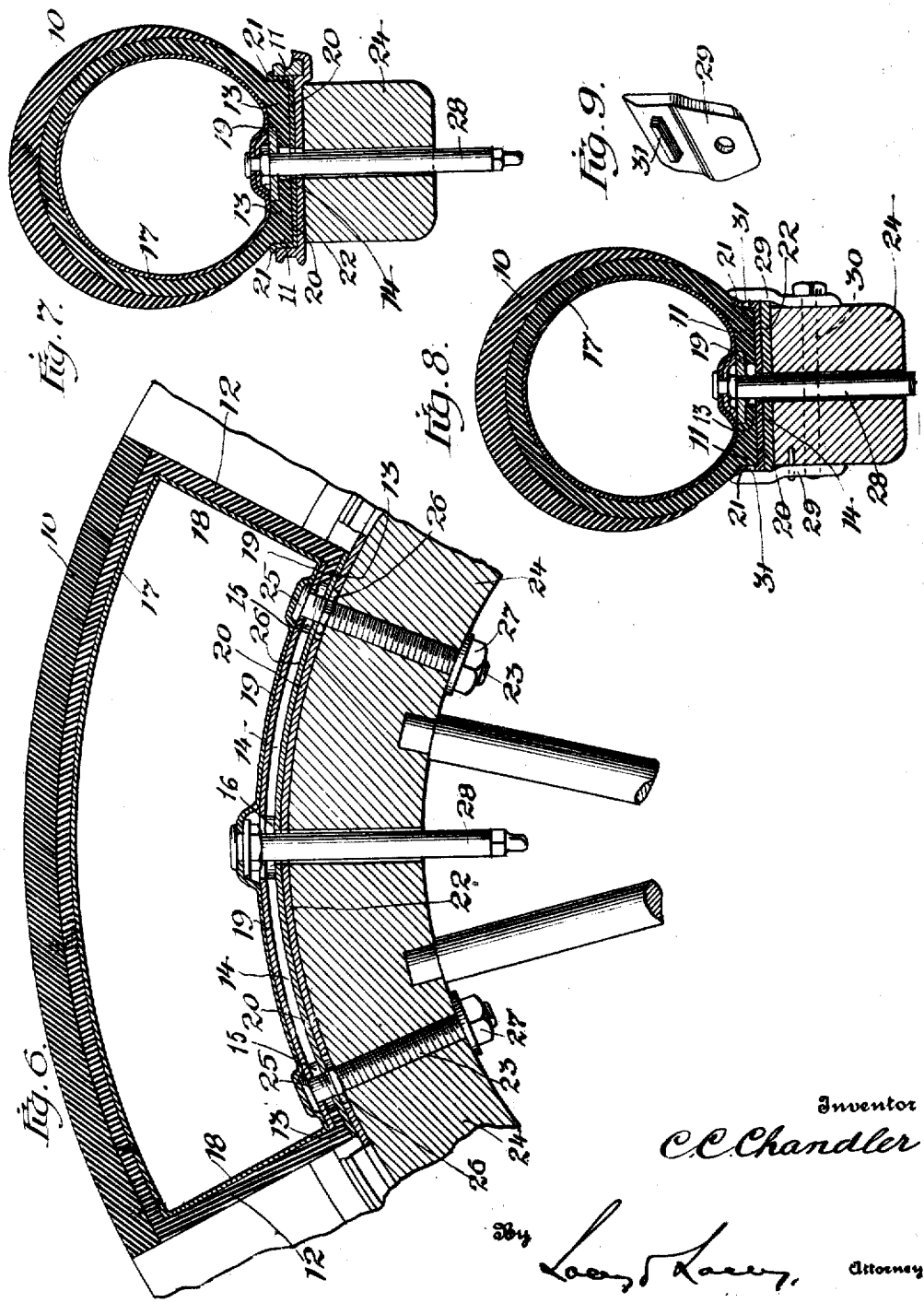
Inventor
C.C. Chandler
By
Lacey & Lacey, Attorneys

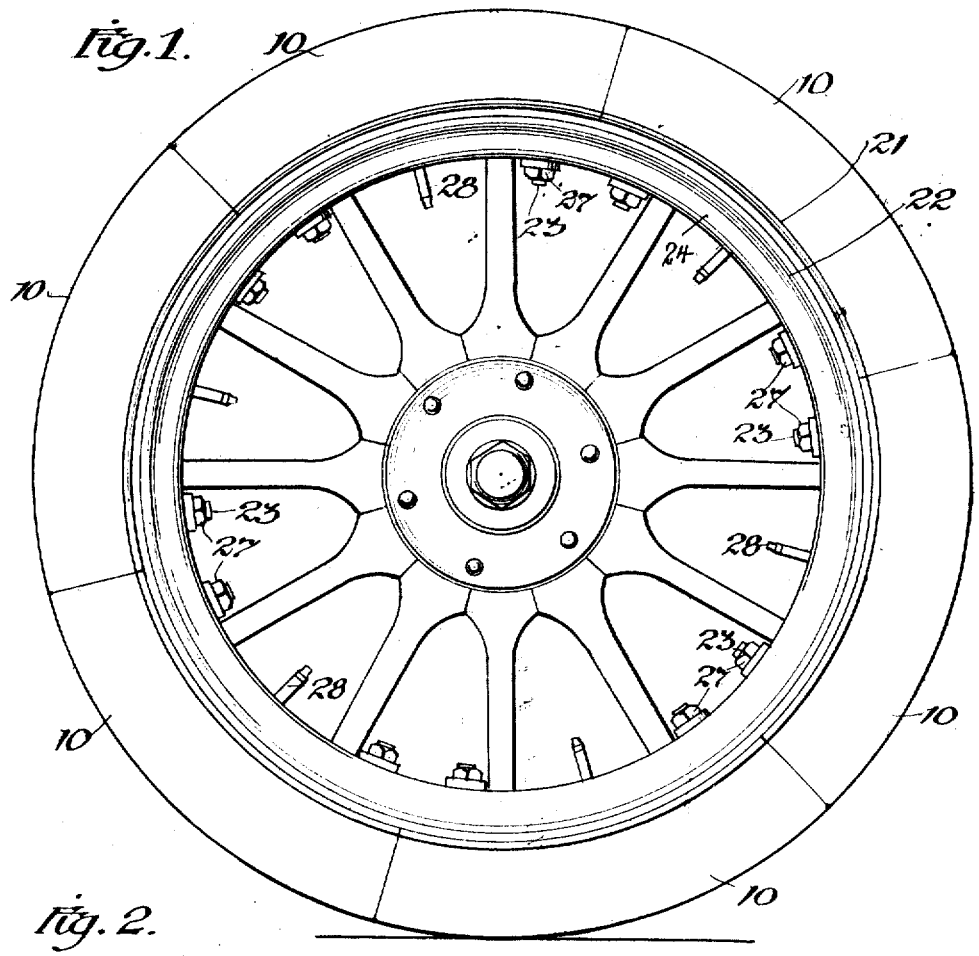
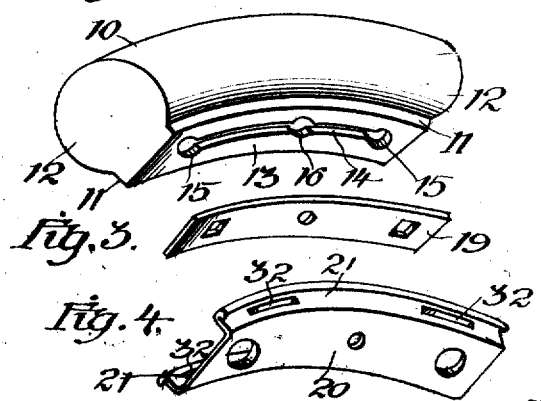
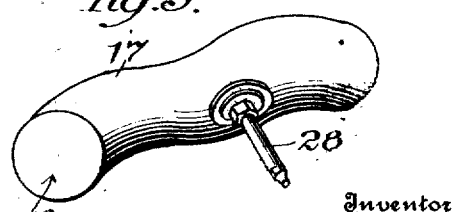

UNITED STATES PATENT OFFICE.

CHESTER C. CHANDLER, OF KINGSVILLE, TEXAS.

SECTIONAL PNEUMATIC TIRE.

1,297,097.         Specification of Letters Patent.     Patented Mar. 11, 1919.

Application filed May 8, 1918. Serial No. 233,220.

*To all whom it may concern:*

Be it known that I, CHESTER C. CHANDLER, a citizen of the United States, residing at Kingsville, in the county of Kleberg and State of Texas, have invented certain new and useful Improvements in Sectional Pneumatic Tires, of which the following is a specification.

This invention relates to the pneumatic tires of automobiles and like vehicles, and has for one of its objects to provide a tire formed in a plurality of segmental sections engaging end to end to form a complete tire encircling the rim and felly of the wheel and independently secured to the rim and felly, and each provided with an independent inflatable inner tube.

Another object of the invention is to provide a pneumatic tire including independent sectional units, each having its own inflatable tube, and means for independently securing the tire units to the rim and felly, whereby one or more of the units may be detached or applied without effecting the remaining units.

With these and other objects in view, the invention consists in certain novel features of construction, as hereinafter shown and described and then specifically pointed out in the claims; and in the drawings illustrative of the preferred embodiment of the invention—

Figure 1 is a side elevation of an automobile wheel with the improved sectional tire applied.

Fig. 2 is a detached perspective view of one of the casing units.

Fig. 3 is a detached perspective view of one of the inner clamp members.

Fig. 4 is a detached perspective view of one of the outer clamp members.

Fig. 5 is a detached perspective view of one of the inflatable tube sections.

Fig. 6 is an enlarged sectional detail of one of the tire units.

Fig. 7 is a transverse section of Fig. 6.

Fig. 8 is a view similar to Fig. 7, illustrating a modification in the construction.

Fig. 9 is a detached perspective view of one of the clamping members employed in the modification shown in Fig. 8.

The improved device comprises a tire formed of a plurality of segmental casing sections conforming in outline substantially to an ordinary tire casing, and located around the rim of the wheel and engaging end to end. Each casing section is indicated as a whole at 10, and may be constructed substantially in the same manner and of the same material as any of the ordinary tire casings. The improved device may be adapted without material structural change to any of the various forms of casings in common use, but for the purpose of illustration an ordinary form of casing is employed as shown more particularly in Fig. 7, and includes rim engaging flanges represented at 11. The improved casing section is closed at the ends as shown at 12 and at the inner side as shown at 13 and the portion 13 reduced in thickness. The closed ends 12 extend radially of the wheel so that the ends of the sections abut flatly against each other.

Each casing section 10 is provided with a longitudinally directed slot 14 through its inner side 13 as shown in Fig. 2, the slot being enlarged at the ends as shown at 15 and centrally of the ends as shown at 16, the slot providing means for the insertion of a sectional inner tube 17. The inner tube section conforms transversely substantially to the interior of the casing section and is closed at the ends as represented at 18, the closed ends bearing against the inner faces of the closed ends 12 of the sectional casing members as illustrated in Fig. 6. Bearing upon the inner face of the reduced portion 13 of the casing is an inner clamp member 19, preferably of metal, and bearing against the outer face of the reduced portion 13 is an outer clamping member 20, the member 20 having outturned flanges 21 conforming to and adapted to bear against the beads or flanges 11 of the casing section as shown in Fig. 7. The members 20—21 correspond in length to the tire sections and abut end to end around the wheel and engage the rim portion 22 of the wheel, as shown in Fig. 7, Near their ends the members 19 and 20 are pierced to receive clamp bolts 23, the latter being of sufficient length to extend through the felly portions 24 of the wheel. The bolts 23 are headed at their inner ends as shown at 25, the heads bearing against the inner face of the member 19. The bolts 23 are each threaded to receive clamp nuts 26 which operate to clamp the members 19—20 together and likewise clamp the bottom portion 13 of the casing between them as illustrated in Fig. 6. The bolts 23 are likewise provided with clamp nuts 27 at their inner ends bearing against the inner face of the felly 24. By this means the sectional tire devices are firmly clamped in position upon the wheel and held together from end to end.

Each inner tube member 17 is provided with a valve device 28 to provide for the inflation of the inner tube, the valve device extending through central apertures in the members 19 and 20 and likewise through an aperture in the felly 24 as illustrated in Fig. 7. The bolts 23 and the valve stem 28 extend respectively through the enlargements 15 and 16 of the slot 14.

By this arrangement it will be obvious that each tire section including its inner tube and clamp members 19—20 may be independently attached to the felly, and in event of puncture of any individual casing and its inner tube, a perfect inner tube section may be substituted for the impaired tube without discarding the other parts of the tire. It is also obvious that in event of the impairment of one or more of the sectional tire casings or units, the impaired unit may be detached and renewed without interfering with the remaining units.

The tire sections including their attachments are precisely alike, and are interchangeable, and can therefore be manufactured in large quantities and furnished to the trade, and attached to the wheels in place of the ordinary tire.

The sectional casings will preferably be arranged so that one pair of the spokes of the wheel are disposed opposite each casing so that one of the clamp bolts 23 of each casing will be arranged between one pair of the spokes while the air valve 28 will be arranged between another pair of the spokes, as shown more clearly in Fig. 6. By this means the strains are uniformly distributed around the wheel.

As before stated the improved device may be applied to wheel rims of various forms and sizes, and in Fig. 8 the rim 22 is in the form of a flat band and held in position upon the tire by clamp members 29, the clamp members being held in position by clamp bolts 30 passing through the clamp devices and likewise through the felly 24. When the clamp members 29 are employed each will be provided with an inwardly directed lug 31 passing through slots 32 in the sides 21 of the members 20. By this means the improved attachment may be firmly coupled to the wheel and any accidental displacement prevented.

Having thus described the invention, what is claimed as new is:

1. A tire unit for vehicle wheels comprising a segmental casing closed except for a longitudinally directed slot in its bottom wall, an inflatable tube section within the casing, an inner clamp member disposed within said casing and forming a closure for the slot, an outer clamp member bearing against the outer face of the bottom wall of the casing at the slot, threaded bolts extending through the clamp members and provided with heads bearing against the inner clamp member, nuts threaded on the bolts and bearing against the outer clamp member for clamping the lower wall of the casing between said clamp members, said bolts being extended through the felly of the wheel and provided with nuts for engagement with said felly.

2. A tire unit for vehicle wheels including a segmental casing closed except for a longitudinally directed slot in its lower wall, the walls of said slot being cut away to form terminal and intermediate enlargements, an inner clamp member of the same length as and disposed within the casing and forming a closure for the slot there , an outer clamp member, there being terminal and intermediate openings formed in the inner and outer clamp members and registering with the enlargements in the walls of the slot, an inflatable inner tube disposed within the casing and provided with a valve stem extending through the intermediate enlargement of the casing and through the intermediate openings in the inner and outer clamp members, threaded bolts extending through the terminal openings in the inner and outer clamp members and through the terminal enlargement in the casing and provided with heads bearing against the inner clamp member, and nuts threaded on the bolts and bearing against the outer clamp member for clamping the lower wall of the casing therebetween, said bolts being adapted to extend through the felly of the wheel for securing the casing in position thereon.

3. The combination with a vehicle wheel including a felly and rim, of a plurality of segmental casing sections arranged around the felly and each closed except for a longitudinally directed slot in its bottom wall, inner clamping plates disposed within the casing sections and forming closures for the slots thereof, outer clamping members interposed between the rim of the wheel and the lower walls of the casing sections, inflatable tube sections disposed within the casing sections and provided with valve stems extending through the slots of said sections and through the felly of the wheel, threaded bolts extending through the inner and outer clamping members and through the felly of the wheel, nuts engaging the threads on the bolts for clamping the casing sections between the inner and outer clamping members and other nuts threaded on the bolts at the inner face of the felly for holding the casing sections in position on the rim of the wheel.

In testimony whereof I affix my signature.

CHESTER C. CHANDLER. [L. S.]